(12) United States Patent
Ghannam et al.

(10) Patent No.: US 10,549,707 B2
(45) Date of Patent: Feb. 4, 2020

(54) DOOR OPENING RESTRAINT

(71) Applicant: Ford Global Technologies, LLC, Dearborn, MI (US)

(72) Inventors: Mahmoud Yousef Ghannam, Canton, MI (US); Saied Nusier, Canton, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 15/898,312

(22) Filed: Feb. 16, 2018

(65) Prior Publication Data

US 2019/0256029 A1    Aug. 22, 2019

(51) Int. Cl.
| | |
|---|---|
| B60J 5/00 | (2006.01) |
| B60R 21/08 | (2006.01) |
| B60J 5/04 | (2006.01) |
| B62D 25/04 | (2006.01) |
| B62D 25/02 | (2006.01) |
| B60R 21/21 | (2011.01) |
| B60R 21/02 | (2006.01) |

(52) U.S. Cl.
CPC ............ B60R 21/08 (2013.01); B60J 5/0487 (2013.01); B60R 21/21 (2013.01); B62D 25/02 (2013.01); B62D 25/04 (2013.01); *B60R 2021/028* (2013.01)

(58) Field of Classification Search
CPC . F42B 19/06; B60D 1/66; B60R 21/06; B60S 9/12; Y10S 116/13; H01L 2924/00014; H01L 2924/00; A63H 33/003; A63H 17/004; A63H 3/28
See application file for complete search history.

(56) References Cited

U.S. PATENT DOCUMENTS

| | | | | |
|---|---|---|---|---|
| 5,417,470 A | * | 5/1995 | Holt .................... | B60J 5/0416 |
| | | | | 296/146.6 |
| 5,429,410 A | * | 7/1995 | Fleischer ............... | B60J 5/0437 |
| | | | | 296/146.6 |
| 5,588,694 A | | 12/1996 | Koehr | |
| 5,599,057 A | * | 2/1997 | Hirahara ................ | B60J 5/0437 |
| | | | | 296/146.6 |
| 6,135,537 A | * | 10/2000 | Giddons ................ | B60J 5/0431 |
| | | | | 296/146.6 |
| 6,227,609 B1 | * | 5/2001 | Mellis ................... | B60J 5/0444 |
| | | | | 296/146.6 |
| 6,231,112 B1 | * | 5/2001 | Fukumoto .............. | B60J 5/0412 |
| | | | | 296/146.5 |

(Continued)

FOREIGN PATENT DOCUMENTS

| | | |
|---|---|---|
| DE | 102005011808 A1 | 9/2006 |
| EP | 1842707 A1 | 10/2007 |
| EP | 2684835 A1 | 1/2014 |

*Primary Examiner* — Kiran B Patel (74) *Attorney, Agent, or Firm* — Frank A. MacKenzie; Bejin Bieneman PLC (57) ABSTRACT

A vehicle includes a first pillar. The vehicle includes a second pillar having a distal end and spaced from the first pillar. The vehicle includes an extendible member supported by the first pillar and moveable from a retracted position where the extendible member has a first length to an extended position where the extendible member extends to the second pillar spaced from the distal end and has a second length greater than the first length.

19 Claims, 10 Drawing Sheets

(56) References Cited

U.S. PATENT DOCUMENTS

| | | | |
|---|---|---|---|
| 6,382,707 B1 * | 5/2002 | Dunneback | B60J 5/0425 296/146.6 |
| 6,773,031 B2 | 8/2004 | Haig | |
| 6,808,038 B2 | 10/2004 | Schneider | |
| 7,270,364 B1 * | 9/2007 | Kim | B60J 5/0433 296/146.6 |
| 7,331,626 B2 * | 2/2008 | Yoshimoto | B60J 5/0425 296/146.6 |
| 7,547,062 B2 | 6/2009 | Melz et al. | |
| 7,607,716 B2 * | 10/2009 | Buchta | B60J 5/0416 296/146.6 |
| 8,398,149 B2 * | 3/2013 | Weiter | B60J 5/0412 296/146.6 |
| 8,444,208 B2 * | 5/2013 | Inoue | B60J 5/0429 296/146.6 |
| 8,454,078 B2 * | 6/2013 | Sachdev | B60J 5/0425 296/146.6 |
| 8,960,768 B2 * | 2/2015 | Kato | B60J 5/0458 296/146.6 |
| 8,973,971 B1 * | 3/2015 | Henke | B60J 5/0444 296/146.6 |
| 9,150,084 B2 * | 10/2015 | Makowski | B60J 5/0456 |
| 9,403,421 B2 * | 8/2016 | Sugiyama | B60J 5/0429 |
| 9,597,947 B2 * | 3/2017 | Friedman | B60J 5/0468 |
| 9,610,829 B1 * | 4/2017 | Stachewicz | B60J 5/0444 |
| 9,796,425 B2 * | 10/2017 | Tanaka | B62D 25/04 |
| 9,873,312 B2 * | 1/2018 | Eckart | B60J 5/0429 |
| 10,150,353 B2 * | 12/2018 | Hirakawa | B60J 5/0413 |
| 10,253,542 B2 * | 4/2019 | Nam | E05F 5/025 |
| 2002/0024233 A1 * | 2/2002 | Kleino | B29C 44/18 296/146.6 |
| 2004/0026957 A1 * | 2/2004 | Bodin | B60J 5/0429 296/146.6 |
| 2004/0080179 A1 * | 4/2004 | Okazaki | B60J 5/0425 296/146.6 |
| 2004/0104593 A1 * | 6/2004 | Nakagawa | B60J 5/0443 296/146.6 |
| 2005/0017538 A1 * | 1/2005 | Omori | B60J 5/0411 296/146.6 |
| 2007/0145771 A1 * | 6/2007 | Tanaka | B60J 1/17 296/146.6 |
| 2007/0187986 A1 * | 8/2007 | Wikstrom | B60J 5/0429 296/146.6 |
| 2007/0278819 A1 * | 12/2007 | Seksaria | B60J 5/0425 296/146.6 |
| 2009/0236871 A1 * | 9/2009 | Shibasaki | B60J 5/0426 296/146.6 |
| 2010/0225141 A1 * | 9/2010 | Mori | B60J 5/0429 296/146.6 |
| 2010/0242284 A1 * | 9/2010 | Danaj | B23K 20/06 29/897.2 |
| 2010/0301630 A1 * | 12/2010 | Ohta | B60J 5/0427 296/146.6 |
| 2011/0221229 A1 * | 9/2011 | Rouhana | B60J 5/042 296/146.6 |
| 2013/0057018 A1 * | 3/2013 | Reese | B29C 45/1418 296/146.6 |
| 2014/0054929 A1 * | 2/2014 | Son | B62D 21/157 296/203.03 |
| 2014/0246879 A1 * | 9/2014 | Ishigame | B60J 5/0443 296/146.6 |
| 2018/0141415 A1 * | 5/2018 | Baccouche | B29D 99/0003 |
| 2019/0256037 A1 * | 8/2019 | Ghannam | B60J 5/0487 |

\* cited by examiner

DOOR OPENING RESTRAINT

BACKGROUND

A vehicle may include a door. The door may be moveable to a closed position where ingress and egress of occupants to and from the vehicle is inhibited. The door may be moveable to an open position where ingress and egress of occupants to and from the vehicle is permitted. The door may be removable. When the door is removed, ingress and egress of occupants to and from the vehicle is permitted, but not always desired.

DETAILED DESCRIPTION

A vehicle includes a first pillar. The vehicle includes a second pillar having a distal end and spaced from the first pillar. The vehicle includes an extendible member supported by the first pillar and moveable from a retracted position where the extendible member has a first length to an extended position where the extendible member extends to the second pillar spaced from the distal end and has a second length greater than the first length.

The first pillar may be an A-pillar and the second pillar may be a B-pillar.

The vehicle may include a roof supported at the distal end of the second pillar.

The extendible member may be movable from the retracted position to the extended position along a vehicle-longitudinal axis.

The vehicle may include an inflator operatively coupled to the extendible member.

The extendible member may define an inflation chamber, and the inflator may be in fluid communication with the inflation chamber.

The extendible member may include a plurality of telescoping members.

The extendible member may include a folded member.

The second pillar may define a socket, and the extendible member in the extended position may extend into the socket.

The vehicle may include a processor and a memory storing program instructions executable by the processor to actuate the extendible member to move to the extended position upon detecting a vehicle impact.

The vehicle may include a processor and a memory storing program instructions executable by the processor to actuate the extendible member to move to the extended position upon detecting a vehicle impact and based on a determination of whether a door is present between the first pillar and the second pillar.

The vehicle may include a processor and a memory storing program instructions executable by the processor to actuate the extendible member to move to the extended position upon detecting a vehicle impact and before actuating an airbag.

The extendible member in the extended position may be elongated along a vehicle-longitudinal axis.

The vehicle may include a door removably supported at one of the first pillar or the second pillar.

The extendible member in the extended position may define a chamber tapering from a first end to a second end.

The vehicle may include a second extendible member supported by the first pillar and spaced from the extendible member along a vehicle-vertical axis.

The extendible member may be positioned to restrain an occupant in a passenger cabin of the vehicle.

The extendible member may be below a beltline.

The extendible member in the retracted position may be spaced from the second pillar.

With reference to the Figures, wherein like numerals indicate like parts throughout the several views, a vehicle 20 includes a first pillar 22. The vehicle 20 includes a second pillar 24 having a distal end 26 and spaced from the first pillar 22. The vehicle 20 includes an extendible member 28 supported by the first pillar 22 and moveable from a retracted position where the extendible member 28 has a first length L1 to an extended position where the extendible member 28 extends to the second pillar 24 spaced from the distal end 26 and has a second length L2 greater than the first length L1.

The extendible member 28 in the extended position inhibits egress of occupants from the vehicle 20, e.g., during an impact to the vehicle 20

The vehicle 20, shown in FIGS. 1-6 and 11, may be any suitable type of vehicle 20, e.g., an automobile, including a sedan, a pick-up truck, a sport-utility vehicle, etc. The vehicle 20 may define a vehicle-longitudinal axis A1 and a vehicle-vertical axis A2. The vehicle-longitudinal axis A1 may extend from a front end of the vehicle 20 to a rear end of the vehicle 20. The vehicle-vertical axis A2 may extend from a top to a bottom of the vehicle 20. The vehicle-longitudinal axis A1 and the vehicle-vertical axis A2 may be perpendicular to each other.

The vehicle 20 includes a body 30, shown in FIGS. 1-6. The body 30 includes the first pillar 22, the second pillar 24, etc. The body 30 may include a rocker 32. The body 30 may include a roof 34.

The pillars 22, 24 extend upwardly from the rocker 32. Each pillar 22, 24 may include the distal end 26. The distal ends 26 are spaced from the rocker 32. The pillars 22, 24 are spaced from each other. For example, the second pillar 24 may be spaced from the first pillar 22, e.g., along the vehicle-longitudinal axis A1.

Figure 2:
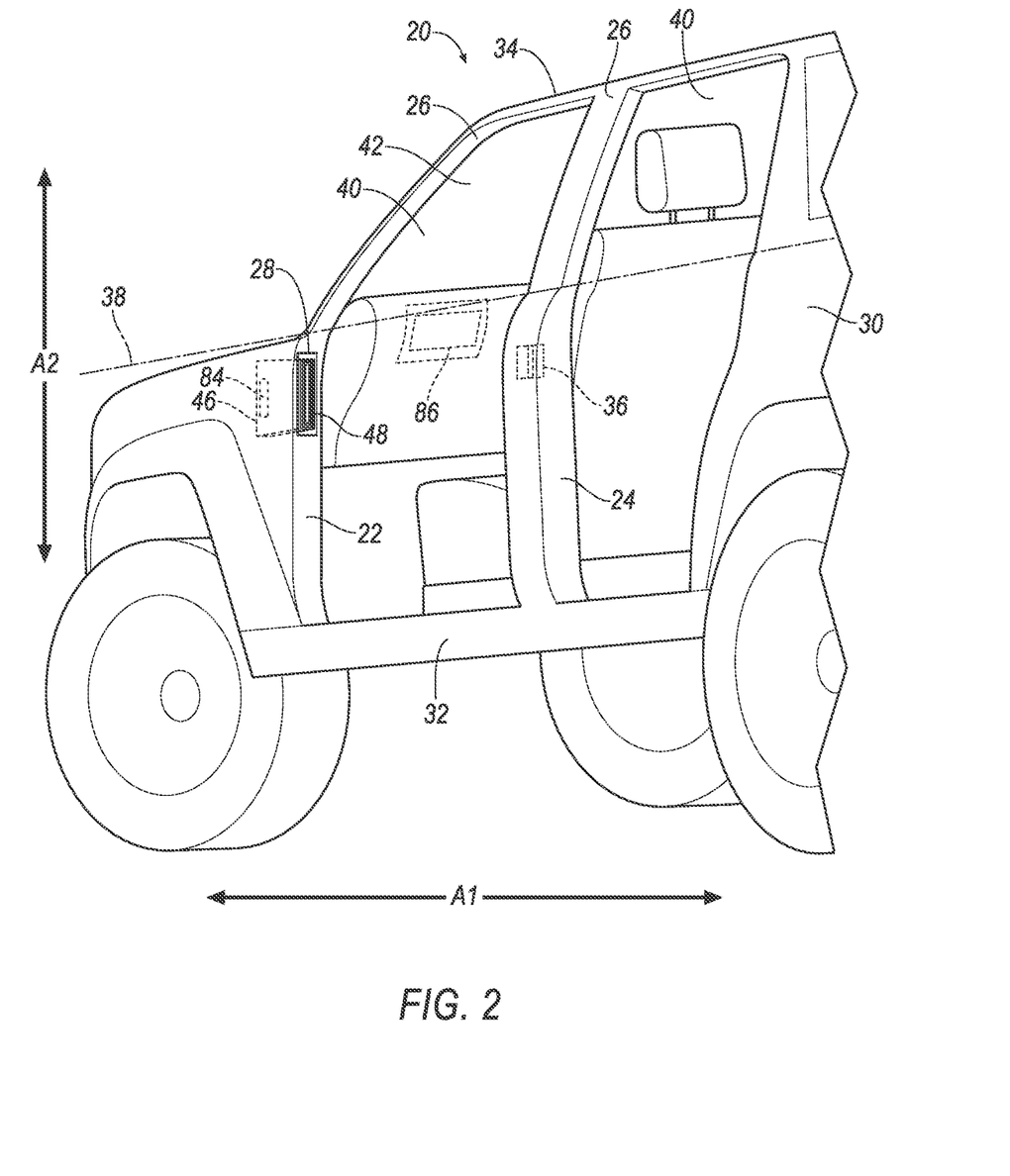
FIG. 2 is a perspective view of the vehicle of FIG. 1 with doors removed from the vehicle.
Figure 3:
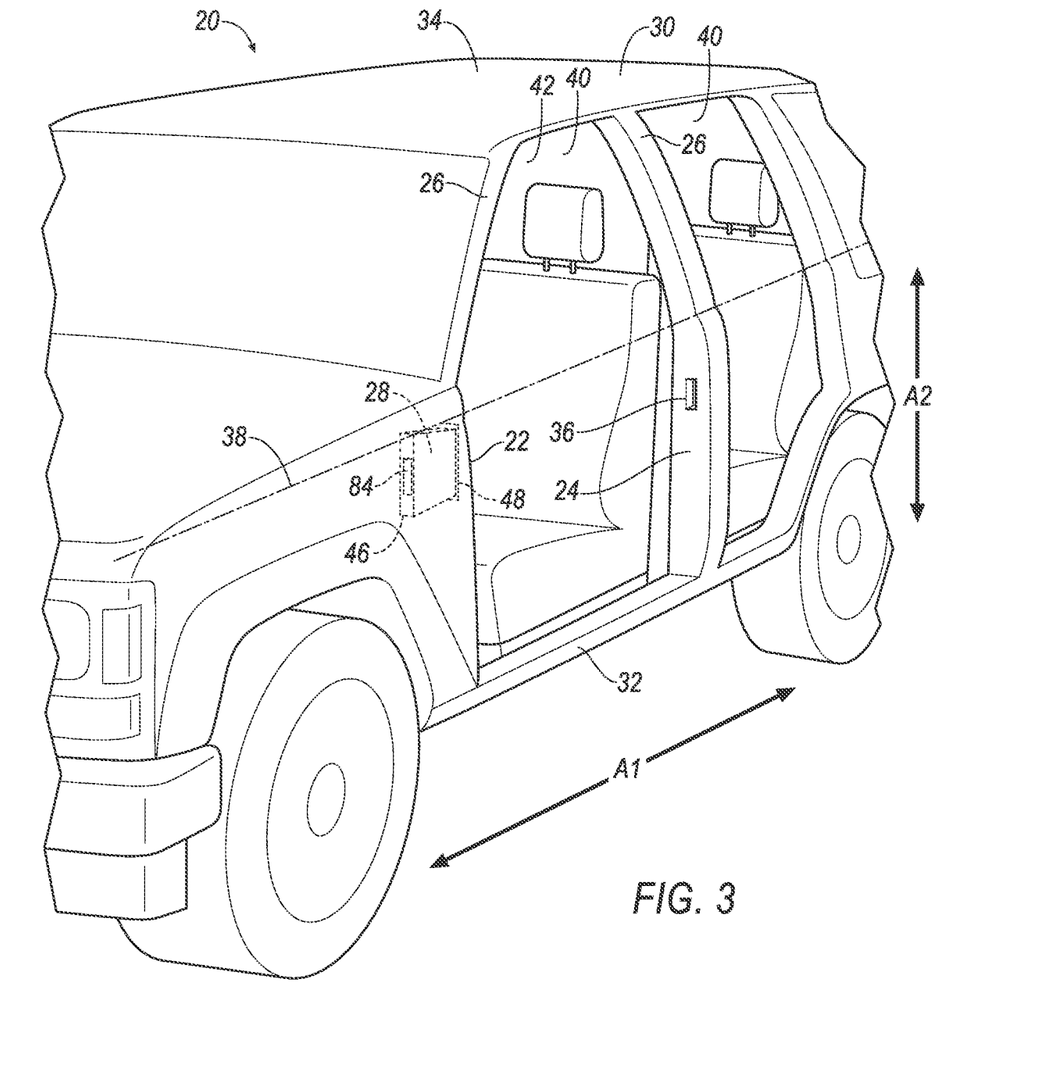
FIG. 3 is a perspective view of the vehicle of FIG. 2.
Figure 4:
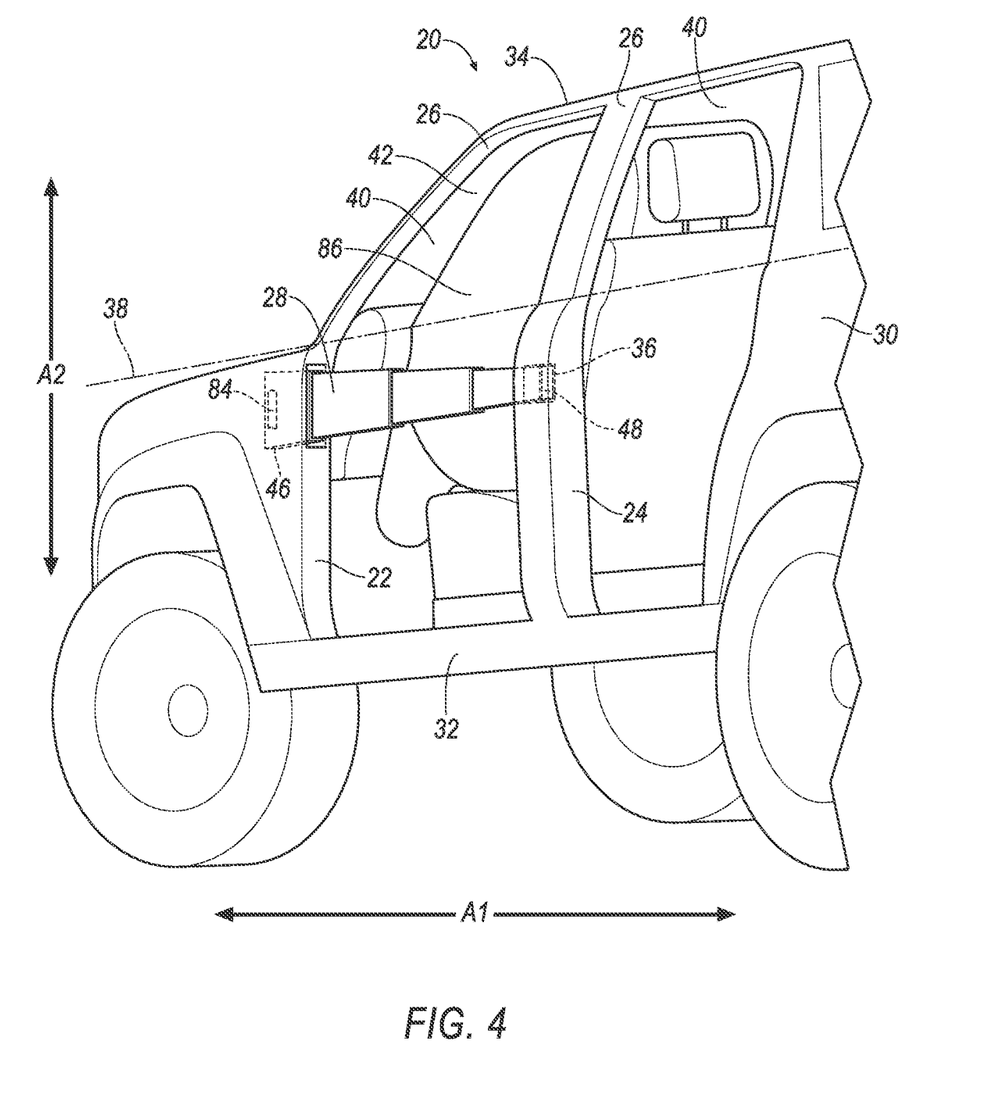
FIG. 4 is a perspective view of the vehicle of FIG. 2 with the extendible member in an extended position.
Figure 5:
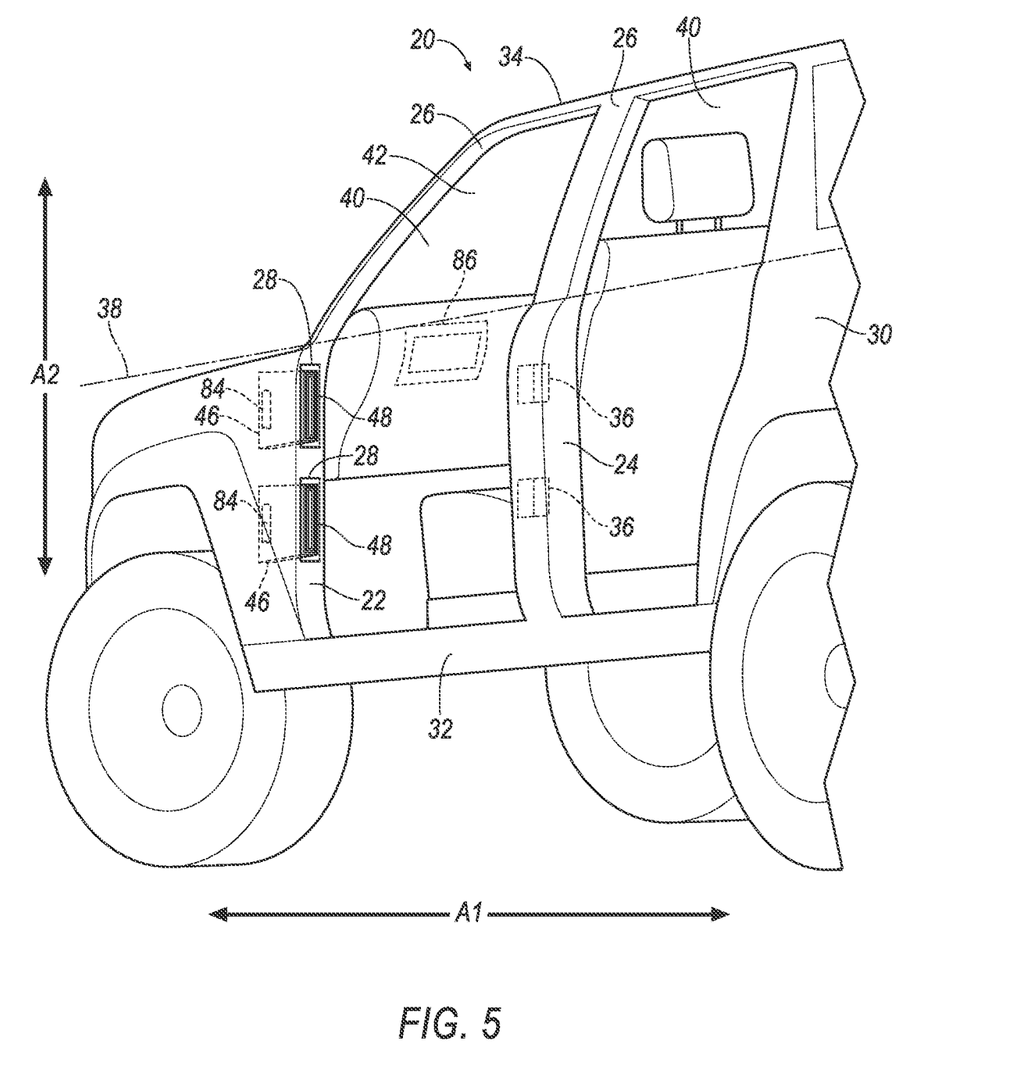
FIG. 5 is a perspective view of a vehicle have multiple extendible members.
Figure 6:
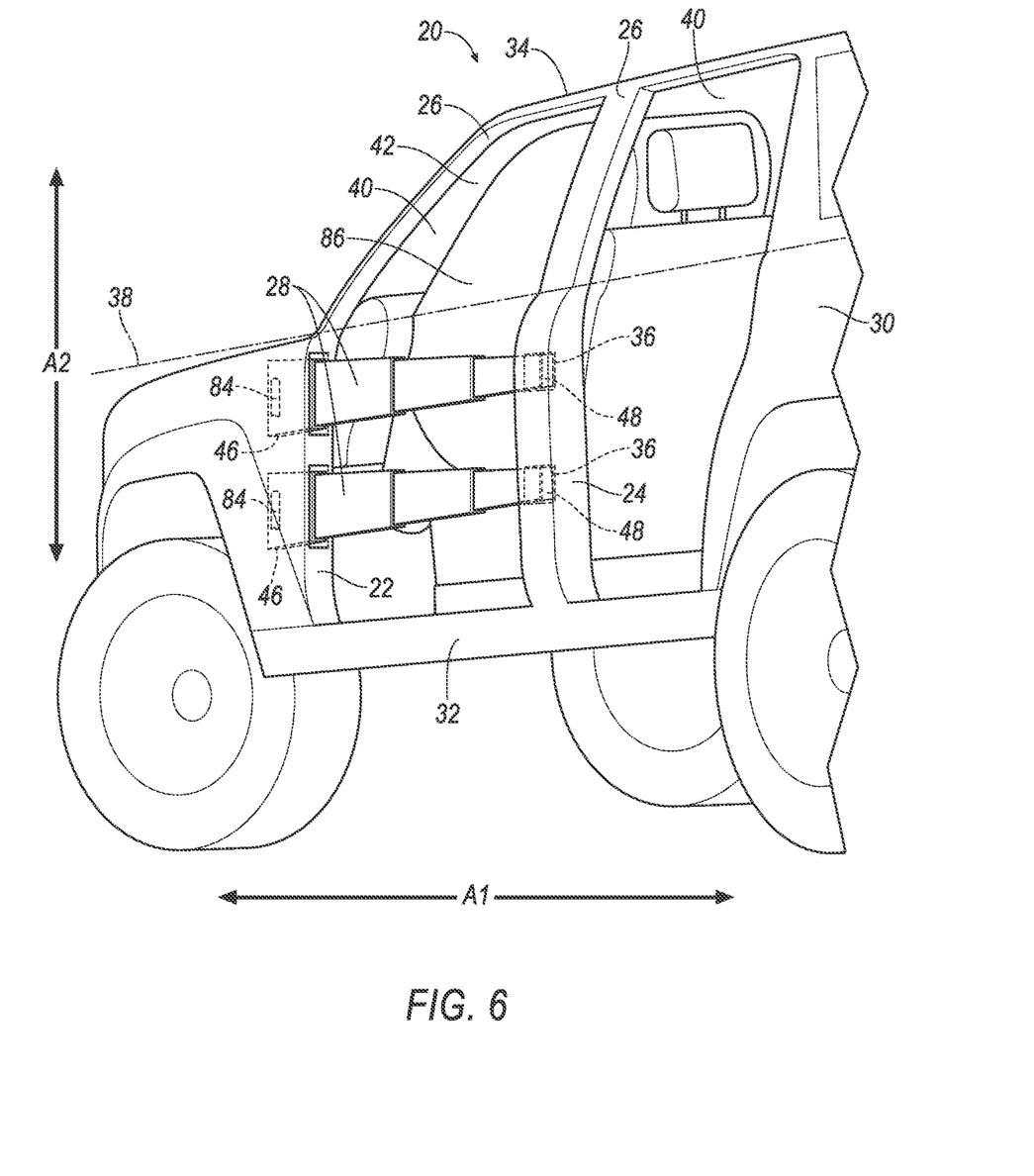
FIG. 6 is a perspective view of the vehicle of FIG. 5 with the extendible members in extended positions.

The second pillar 24 may define a socket 36, shown in FIGS. 2-6. The socket 36 is designed to receive the extendible member 28 in the extend position, as shown in FIGS. 4 and 6. The socket 36 may be between the rocker 32 and the distal end 26 of the second pillar 24. The socket 36 may be below a beltline 38 of the vehicle 20 (described below).

The rocker 32 may extend along the vehicle-longitudinal axis A2 at the bottom of the vehicle 20. The rocker 32 may extend between the first pillar 22 and the second pillar 24.

The roof 34 provides cover and protection to occupants of the vehicle 20. The roof 34 may include an internal panel, an exterior panel, and a headliner. The internal panel provides support to the exterior panel, the headliner, etc. The internal panel may be made of steel, aluminum, carbon fiber, or any other suitable material. The headliner and the exterior panel provide class-A surfaces to the roof 34, i.e., surfaces specifically manufactured to have a high-quality, finished aesthetic appearance free of blemishes, etc. The roof 34 may be supported at the distal ends 26 of the first pillar 22, the second pillar 24, etc.

The body 30 may have a unibody construction, i.e., a unitary-body construction. In the unibody construction, the body 30, e.g., the rockers 32, the pillars 22, 24, the roof 34, etc., serves as a frame of the vehicle 20. As another example not shown in the Figures, the body 30 and a frame of the vehicle 20 may have a body-on-frame construction (also referred to as a cab-on-frame construction). In other words, the body 30 and frame are separate components, i.e., are modular, and the body 30 is supported on and affixed to the frame. Alternatively, the body 30 and frame may have any suitable construction. The body 30 and/or the frame may be formed of any suitable material, for example, steel, aluminum, etc.

The body 30 defines a door opening 40 between the first pillar 22 and the second pillar 24, and between the rocker 32 and the roof 34. The first pillar 22 and the second pillar 24 are disposed on opposite sides of the door opening 40. For example, the first pillar 22 may be an A-pillar and the second pillar 24 may be a B-pillar. The door opening 40 may extend continuously from the first pillar 22 to the second pillar 24, and from the rocker 32 to the roof 34. The adjectives "first" and "second" are used throughout this document as identifiers and are not intended to signify importance or order. For example, the first pillar 22 may be the B-pillar, the second pillar 24 may be the A-pillar, a C-pillar, etc.

The vehicle 20 may include a passenger cabin 42. The passenger cabin 42 may define where an occupant may ride in the vehicle 20. The passenger cabin 42 may include a plurality of seats on which the occupant may sit, etc.

Figure 1:
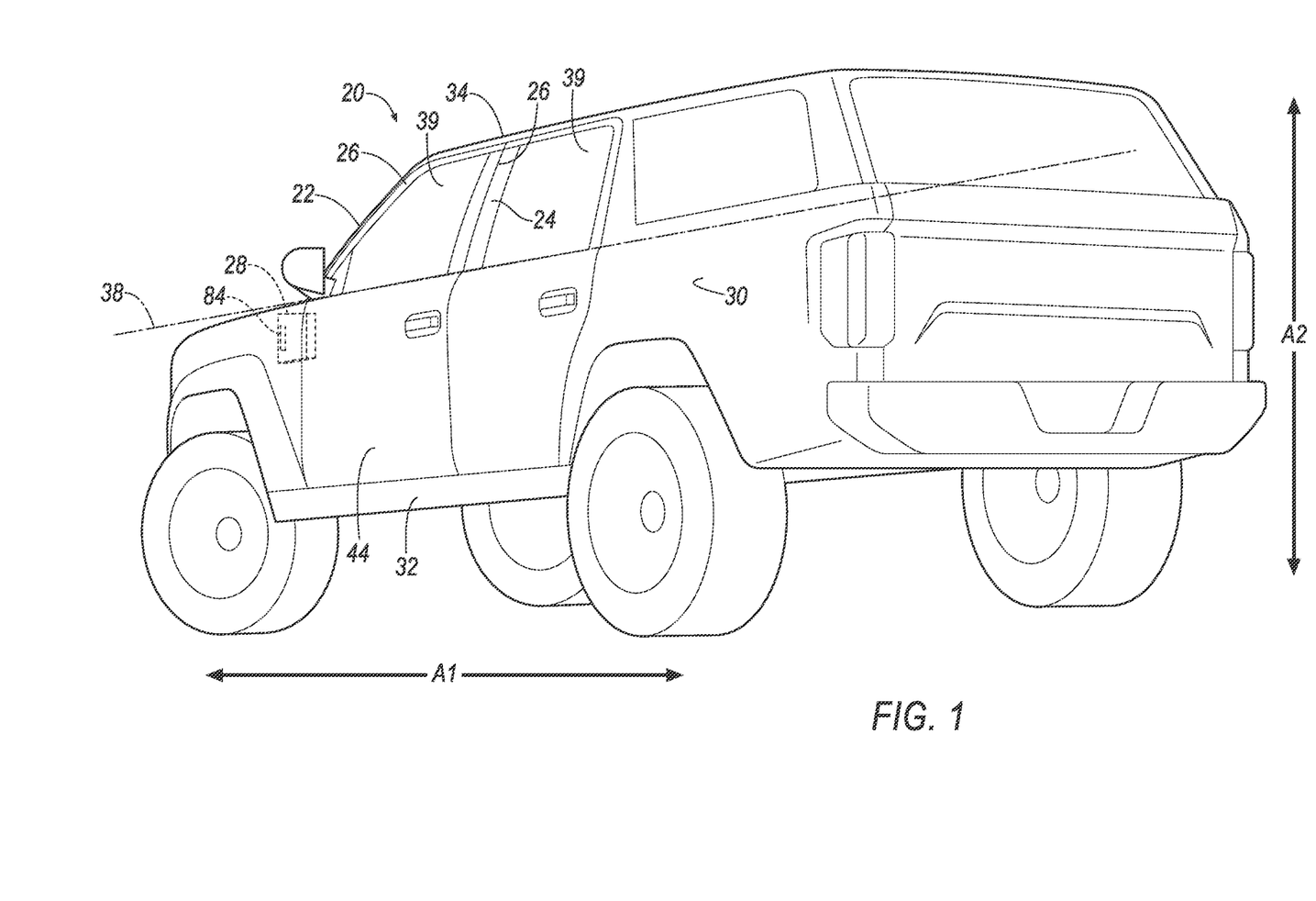
FIG. 1 is a perspective view of a vehicle having an extendible member.

The vehicle 20 may include one or more doors 44. The doors 44 may be removably supported by the body 30 of the vehicle 20, e.g., at the first pillar 22, the second pillar 24, etc. For example, the door 44 may be moved from being supported by the body 30 of the vehicle 20, as shown in FIG. 1, to being spaced from the body 30 of the vehicle 20, e.g., such that the vehicle 20 may be operated without doors 44, as shown in FIGS. 2-6.

When the doors 44 are supported by the body 30, the doors 44 are moveable relative to the body 30 between a closed position (shown in FIG. 1) and an open position (not shown). The rockers 32 are below the doors 44 when the doors 44 are in the closed position. When the doors 44 are in the closed position, the doors 44 retain occupants in the passenger cabin 42 of the vehicle 20. When the doors 44 are in the open position, the doors 44 allow an occupant ingress and egress from the passenger cabin 42. When the doors 44 are not supported by the body 30, the doors 44 do not retain occupants in the vehicle 20.

The vehicle 20 may define the beltline 38. The beltline 38 extends along the vehicle-longitudinal axis A1 and is between the roof 34 and rocker 32. For example, the vehicle 20 may include one or more windows 39, and the beltline 38 may be at a bottom edge of one or more of the windows.

The vehicle 20 includes one or more extendible members 28, 128, shown in FIGS. 1-10. Each extendible member 28, 128 is moveable from a retracted position, shown in FIGS. 1-3, 5, 7, and 9, to an extended position, shown in FIGS. 4, 6, 8, and 10. In the retracted position, the extendible member 28, 128 has the first length L1, shown in FIGS. 7 and 9. In the extended position, the extendible member 28, 128 has a second length L2, shown in FIGS. 8 and 10. The second length L2 is greater than the first length L1. The length of the extendible member 28, 128 in the retracted position and the extended position may be between opposing ends 46, 48 of the extendible member 28, 128. The extendible member 28, 128 may move from the retracted position to the extended position along the vehicle-longitudinal axis A1.

With reference to FIGS. 2, 3 and 5, the extendible member 28 in the retracted position is spaced from the second pillar 24, e.g., along the vehicle 20 longitudinal axis. For example, the end 48 of the extendible member 28 may be spaced from the socket 36 of the second pillar 24.

With reference to FIGS. 4 and 6, the extendible member 28 in the extended position extends to the second pillar 24. For example, the end 48 may abut the second pillar 24. As another example, the extendible member 28 in the extended position may extend into the socket 36. To put it another way, the end 48 of the extendible member 28 may be engaged with the socket 36 when the extendible member 28 is in the extended position, as shown in FIGS. 4 and 6.

The extendible member 28 may be supported by the first pillar 22. For example, the extendible member 28 may be fixed to the first pillar 22, e.g., via fasteners, clips, adhesives, etc. The extendible member 28 is spaced from the distal ends 26 of the pillars 22, 24. To put it another way, the ends of extendible member 28 may be spaced from the roof 34.

The extendible members 28 may be spaced from each other. For example, one extendible member 28 may be spaced from another extendible member 28 along the vehicle-vertical axis A2, as shown in FIGS. 5 and 6.

The extendible member 28 is positioned to restrain an occupant in the occupant cabin 42 of the vehicle 20, e.g., when the extendible member 28 is in the extended position. To put it another way, the extendible member 28 in the extended position is designed to restrict egress of an occupant from the passenger cabin 42 in the event of a vehicle impact. For example, the extendible member 28 may be below the beltline 38. For example, the extendible member 28 in the extended position may be elongated along the vehicle-longitudinal axis A1 across the door opening 40 between the first pillar 22 and the second pillar 24.

Although not shown, it is to be understood that the extendible member 128 may be implemented in the vehicle 20 as described for the extendible member 28.

Figure 7:
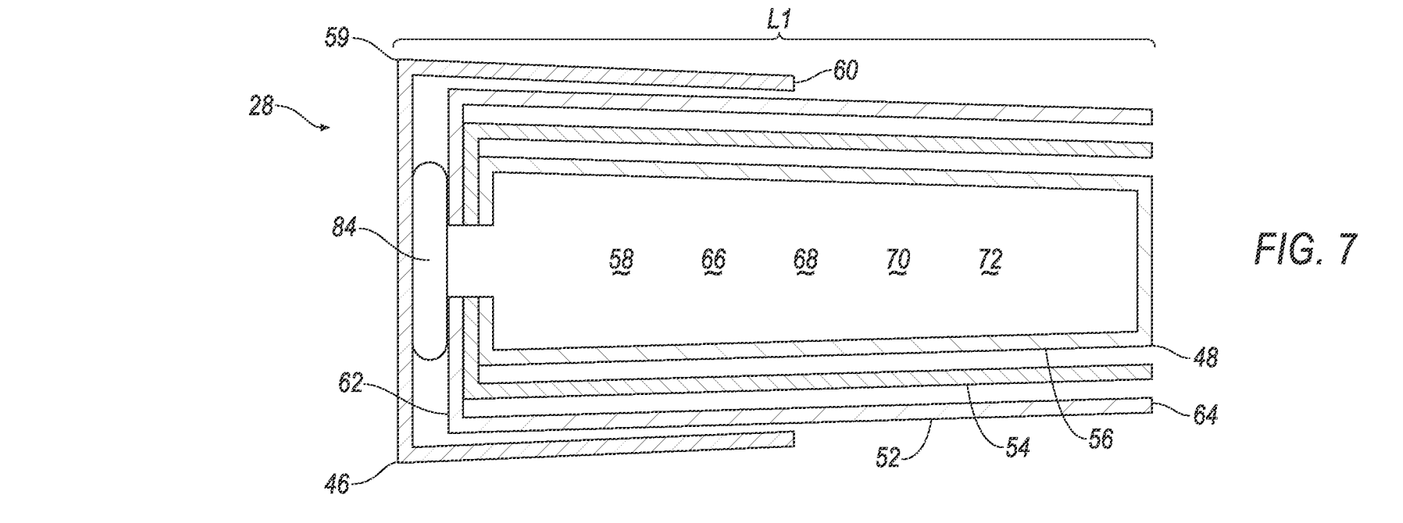
FIG. 7 is a cross section of the extendible member in a retracted position.
Figure 8:
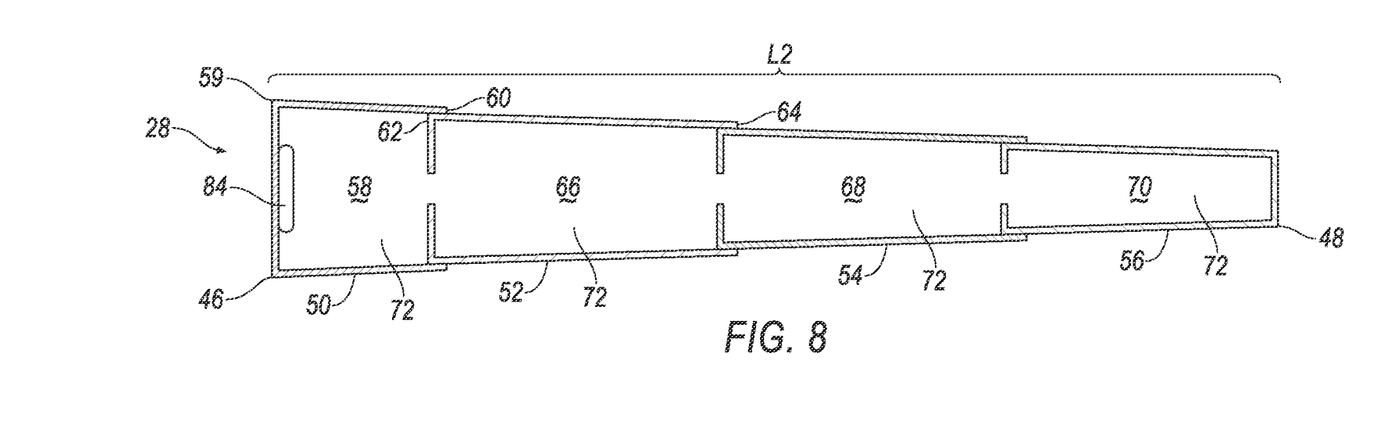
FIG. 8 is a cross section of the extendible member in the extended position.

The extendible member 28 may include a plurality of telescoping members 52, 54, 56, shown in FIGS. 7 and 8. For example, the extendible member 28 may include a base 50, a first telescoping member 52, a second telescoping member 54, and a third telescoping member 56, etc. The plurality of telescoping members 52, 54, 56 may be nested in the base 50 when the extendible member 28 is in the retracted position. Specifically, in the retracted position, the base 50 may be fixed to the first pillar 22 and may telescopically house the first telescoping member 52, the second telescoping member 54, and the third telescoping member 56. That is, the base 50 may define a base chamber 58 and the first telescoping member 52, the second telescoping member 54, and the third telescoping member 56 may be disposed in the base chamber 58 in the retracted position. The extendible member 28 may include additional telescoping members (not shown). The base 50 and the telescoping members 52, 54, 56 may be frusto-tetrahedral, as shown in the figures. Alternatively, the base 50 and the telescoping members 52, 54, 56 may be of any suitable shape, e.g., frusto-conical, frusto-pyrimidal, cylindrical, rectangular hexahedral, etc.

When the inflator 84 is activated, the inflator 84 inflates the extendible member 28 to elongate the extendible member 28 from the retracted position to the extended position. Specifically, the first telescoping member 52 may define a chamber 66. The second telescoping member 54 may be disposed in the chamber 66 when the first telescoping member 52 and the second telescoping member 54 are in the retracted position, as shown in FIG. 7. The second telescoping member 54 may define a second chamber 68, and the third telescoping member 56 may be disposed in the second chamber 68 when the second telescoping member 54 and the third telescoping member 56 are in the retracted position. The third telescoping member 56 may define a third chamber 70.

The chambers 58, 66, 68, 70 are in fluid communication with each other to define a common chamber 72. Specifically, the first telescoping member 52, the second telescoping member 54, and the third telescoping member 56 each define an orifice 96 that fluidly connects the base 50, the first telescoping member 52, the second telescoping member 54, and the third telescoping member 56. When the inflator 84 is activated, the inflator pressurizes 84 the chambers 58, 66, 68, 70 to inflate the extendible member 28 to the extended position.

The base 50 and the telescoping members 52, 54, 56 may each taper such that the base 50 and the telescoping members 52, 54, 56 wedge against each other in the extended position. Specifically, the base 50 may taper from a first edge 59 to a second edge 60. That is, the base 50 may be shaped such that a cross-sectional area defined by the first edge 59 is larger than a cross-sectional area defined by the second edge 60. The telescoping members 52, 54, 56 may be telescopically received by the base 50. The first telescoping member 52 may taper from a first edge 62 to a second edge 64. In other words, the first telescoping member 52 may be shaped such that a cross-sectional area defined by the first edge 62 is larger than the cross-sectional area defined by the second edge 60 of the base 50. The first telescoping member 52 may be wedged with the base 50 when the extendible member 28 is in the extended position, as shown in FIG. 8. That is, when the first telescoping member 52 deploys to the extended position, the first edge 62 of the first telescoping member 52 may create a friction fit with the second edge 60 of the base 50, wedging the first telescoping member 52 to the base 50. Similarly, the second telescoping member 54 may be wedged with the first telescoping member 52, the third telescoping member 56 may be wedged with the second telescoping member 54, etc.

In the extended position, the common chamber 72 may taper from one end 46 of the extendible member 28 to the opposite end 48. One end 46 may be at the first pillar 22, and the opposite end 48 may be at the second pillar 24. To put it another way, a cross sectional area of the common chamber 72 may decrease the closer the cross-sectional area is to the end 48. For example, a cross sectional area of the common chamber 72 at the base 50 may be greater than a cross sectional area of the common chamber 72 at the third telescoping member 56.

Figure 9:
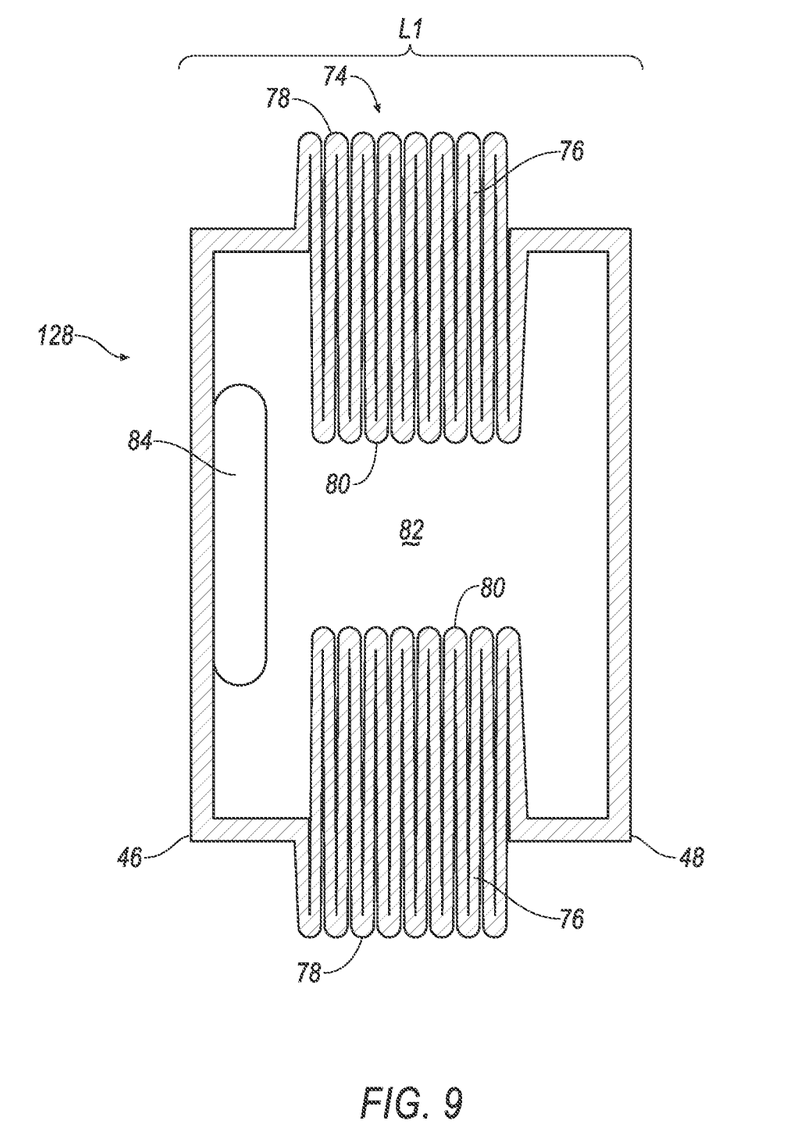
FIG. 9 is a cross section of an alternate embodiment of the extendible member in a retracted position.
Figure 10:
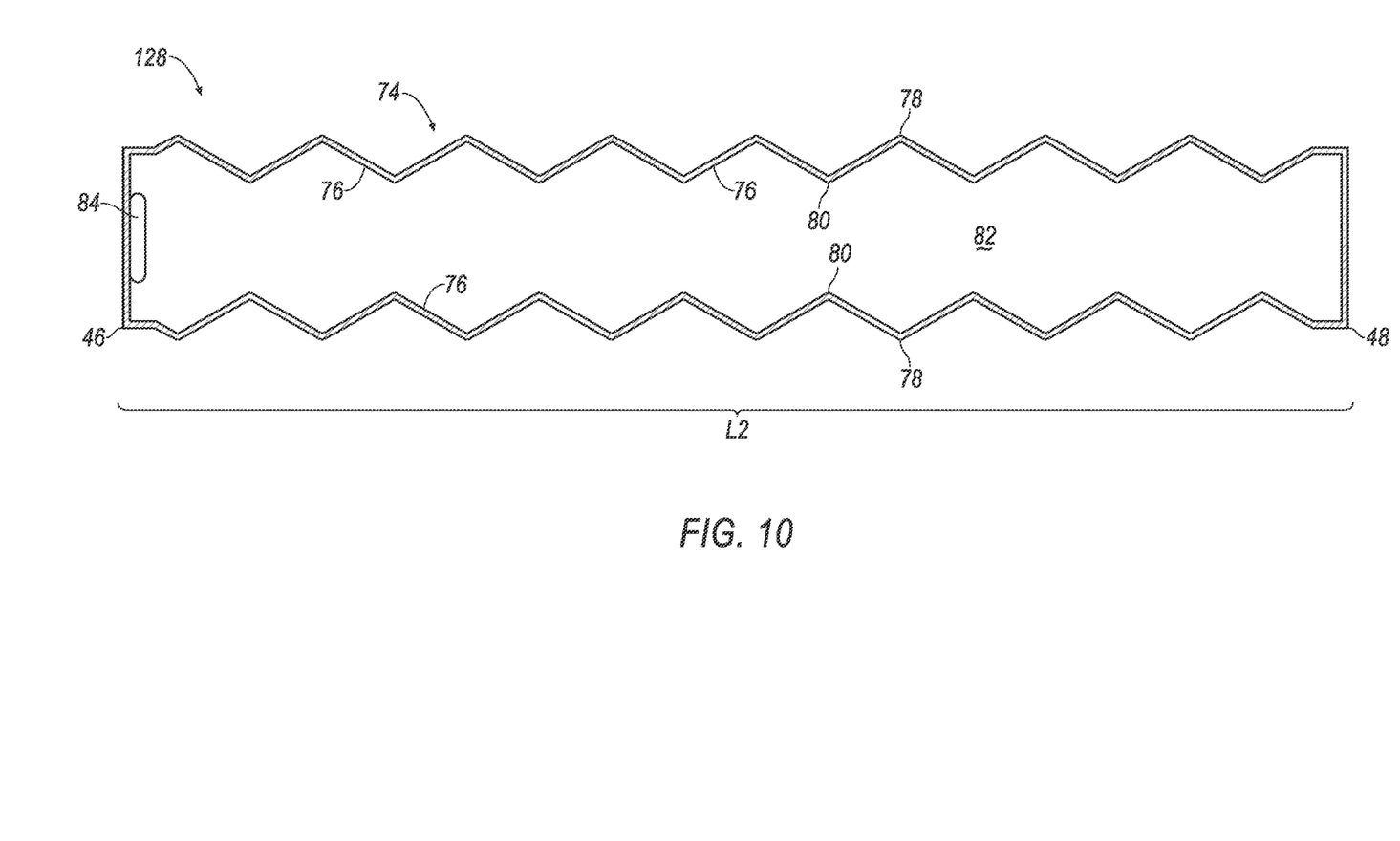
FIG. 10 is a cross section of the alternate embodiment of the extendible member of FIG. 9 in an extended position.

With reference to the embodiment shown in FIGS. 9 and 10, the extendible member 128 may include a folded member 74, as shown in FIGS. 9 and 10. In the retracted position, the folded member 74 includes a series of portions 76 that extend transversely from each other at alternating peaks 78 and valleys 80. To put it another way, in the retracted position the portions 76 of the folded member 74 are folded over each other. In the extended position, the peaks 78 and valleys 80 are further from each other, e.g., compared to the retracted position. To put it another way, in the extended position the portions 76 of the folded member 74 may be unfolded. The folded member 74 may enclose a chamber 82. The folded member 74 may be sealed to the ends 47, 48, e.g., such fluid is restricted for exiting the chamber 82. In other words, the folded member 74 and the ends 46, 48 enclose the chamber 82 such that fluid provided to the chamber 82, e.g., from the inflator 84, causes an increase in fluid pressure in the chamber 82. The extendible member 128 may be made of plastic, metal, or any suitable material, including a combination thereof.

The vehicle 20 may include an inflator 84. The inflator 84 is operatively coupled to the extendible member 28, 128. In other words, the inflator 84 provides inflation medium to the extendible member 28, 128 to move the extendible member 28 from the retracted position to the extended position. The inflator 84 may be in fluid communication with the chamber 58, 82 of the extendible member 28, 128, e.g., directly, through various piping, etc. The inflator 84 may be, for example, a pyrotechnic inflator that use a chemical reaction to drive inflation medium to the chamber 58, 82. The inflator 84 may be of any suitable type, for example, a cold-gas inflator. The inflator 84 may be supported by the first pillar 22, or by any other suitable location of the vehicle 20. The vehicle 20 may include one or more inflators 84 to move each extendible member 28, 128 from the retracted position to the extended position.

The inflator 84 may be disposed in the extendible member 28, 128.

For example, in the embodiment shown in FIGS. 2-8, the inflator 84 may be disposed in the base 50 and may be in fluid communication with the first telescoping member 52, the second telescoping member 54, and the third telescoping member 56. As another example, the inflator 84 may be outside the base 50 and in fluid communication with the base 50 (not shown).

In the embodiment shown in FIGS. 9 and 10, the inflator 84 may be in the chamber 82 of the folded member 74. As another example, the inflator 84 may be outside the chamber 82 of the folded member 74 and in fluid communication with the chamber 82 of the folded member 74 (not shown). Upon actuation, the inflator 84 may generate an inflation medium, increasing pressure in the chamber 82 of the folded member 74 and may cause the portions 76 to unfold, moving the extendible member 28 to the extended position.

The vehicle 20 may include an airbag 86, shown in FIGS. 2, 4, 5, and 6, deployable during vehicle 20 impacts to absorb energy from occupants of the vehicle 20 during the impact. The airbag 86 may be a component of an airbag assembly including a housing supporting the airbag 86, and one or more inflators 88, shown in FIG. 11, in communication with the airbag 86 for inflating the airbag 86 from an uninflated position, shown in FIGS. 2 and 5, to an inflated position, shown in FIGS. 4 and 6. The airbag 86 in the inflated position may abut the extendible member 28.

Figure 11:
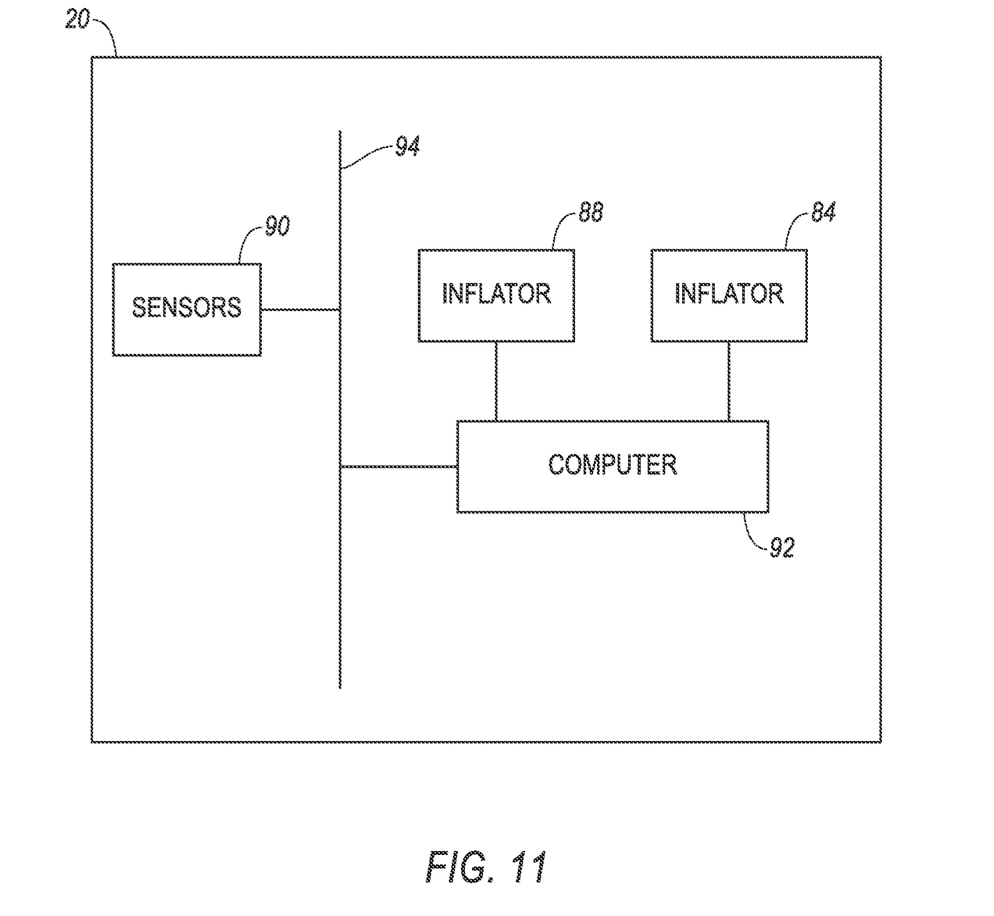
FIG. 11 is a block diagram of components of the vehicle.

The vehicle 20 may include sensors 90, shown on FIG. 11. The sensors 90 may detect whether the door 44 is supported by the body 30. The sensors 90 may detect whether the door 44 is in the open position or the closed position. For example, one or more proximity sensors may be supported by the first pillar 22 and/or the second pillar 24 and designed to detect when the door 44 is supported by the first pillar 22 and/or the second pillar 24. Other sensors 90 may be used to detect whether the door is supported by the body 30, whether the door 44 is in the open position, whether the door 44 in the closed position, etc., such as contact switches, etc. The sensors 90 may be configured to detect an impact to the vehicle 20. For example, post-contact sensors such as accelerometers, pressure sensors, and contact switches; and pre-impact sensors such as radar, LIDAR, and vision-sensing systems may be used to detect impact. The vision systems may include one or more cameras, CCD image sensors, CMOS image sensors, etc. The sensors 90 may be located at numerous points in or on the vehicle 20.

A computer 92 and the sensors 90 may be connected to a communication bus 94, shown in FIG. 11, such as a controller area network (CAN) bus, of the vehicle 20. The computer 92 may use information from the communication bus 94 to control the extendible member 28, 128, the airbag 86, etc., e.g., to actuate the inflator(s) 84, 88. The inflator(s) 84, 88 may be connected directly to the computer 92, as shown in FIG. 11, or the inflator(s) 84, 88 may be connected via the communication bus 94 (not shown).

The computer 92 may be a microprocessor-based computer 92 implemented via circuits, chips, or other electronic components. For example, the computer 92 may include a processor, a memory, etc. The memory of the computer 92 may include memory for storing programming instructions executable by the processor as well as for electronically storing data and/or databases.

The computer 92 may store instructions executable by the processor to actuate the extendible member 28, 128 to move to the extended position upon detecting a vehicle impact. For example, the computer 92 may receive information from the sensors 90, e.g., via the communication bus 94, indicating that an impact has been detected. Upon receiving such information, the computer 92 may transmit an instruction to the inflator 84 to generate inflation medium to move the extendible member 28, 128 to the extended position.

The computer 92 may store instructions executable by the processor to actuate the extendible member 28, 128 to move to the extended position upon detecting a vehicle impact and based on a determination of whether a door is present between the first pillar 22 and the second pillar 24. For example, the computer 92 may receive information from the sensors 90, e.g., via the communication bus 94, indicating that the door 44 is supported by the body 30, indicating that the door 44 is not supported by the body 30, indicating that the door 44 is in the open position, indicating that the door 44 is in the closed position, etc. The computer 92 may determine that the door 44 is present between the first pillar 22 and the second pillar 24 when the computer 92 receives information indicating that the door 44 is supported by the body 30 and is in the closed position. The computer 92 determines that the door 44 is not present when the computer 92 receives information indicating that the door 44 is supported by the body 30 and is in the open position or information indicating that the door 44 is not supported by the body 30. The determination of whether the door 44 is present between the first pillar 22 and the second pillar 24 may be performed before, during or after detecting the vehicle impact. When a determination is made that the door 44 is present, the computer 92 refrains from actuating the extendible member 28, 128 to the extended position when an impact is detected. When a determination is made that the door 44 is not present, the computer 92 actuates the extendible member 28, 128 to the extended position when an impact is detected.

The computer 92 may store instructions executable by the processor to actuate the extendible member 28, 128 to move to the extended position upon detecting a vehicle 20 impact and before actuating the airbag 86. For example, the computer 92 may control one or more inflators 88 designed to inflate the airbag 86. Upon detecting an impact, the computer 92 may first actuate the inflator 84 to move the extendible member 28, 128 to the extended position, and then may actuate the inflator 88 to inflate the airbag 86. Inflating the airbag 86 after the extendible member 28, 128 is in the extended position allows the extendible member 28, 128 to provide a reaction surface to the airbag 86.

In normal operation of the vehicle 20, the extendible member 28, 128 is in the retracted position. While the vehicle 20 is being operated the computer 92 may determine whether the doors 44 are present. In the event of an impact, the sensors 90 may detect the impact and transmit a signal through the communication bus 94 to the computer 92. Next, the computer 92 may transmit a signal to the inflator 84, e.g., when the computer 92 has determined the doors 44 are not supported by the body 30, that the doors 44 are in the open position, etc. Upon receiving the signal, the inflator 84 may discharge and move the extendible member 28, 128 from the retracted position to the extended position. The extendible member 28 in the extended position extends from the first pillar 22 to the second pillar 24 to cover the door opening 40 and restrain occupants within the passenger cabin 42, e.g., by inhibiting egress of the occupants through the door opening 40. After actuating the extendible member 28, the computer 92 may transmit a signal to the inflator 88 to inflate the airbag 86.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a first pillar;
a second pillar having a distal end and spaced from the first pillar; and
an extendible member supported by the first pillar and moveable from a retracted position where the extendible member has a first length to an extended position where the extendible member extends to the second pillar spaced from the distal end and has a second length greater than the first length.

2. The vehicle of claim 1, wherein the first pillar is an A-pillar and the second pillar is a B-pillar.

3. The vehicle of claim 1, further comprising a roof supported at the distal end of the second pillar.

4. The vehicle of claim 1, wherein the extendible member is movable from the retracted position to the extended position along a vehicle-longitudinal axis.

5. The vehicle of claim 1, further comprising an inflator operatively coupled to the extendible member.

6. The vehicle of claim 5, wherein the extendible member defines an inflation chamber, and the inflator is in fluid communication with the inflation chamber.

7. The vehicle of claim 1, wherein the extendible member includes a plurality of telescoping members.

8. The vehicle of claim 1, wherein the extendible member includes a folded member.

9. The vehicle of claim 1, wherein the second pillar defines a socket, and the extendible member in the extended position extends into the socket.

10. The vehicle of claim 1, further comprising a processor and a memory storing program instructions executable by the processor to actuate the extendible member to move to the extended position upon detecting a vehicle impact.

11. The vehicle of claim 1, further comprising a processor and a memory storing program instructions executable by the processor to actuate the extendible member to move to the extended position upon detecting a vehicle impact and based on a determination of whether a door is present between the first pillar and the second pillar.

12. The vehicle of claim 1, further comprising a processor and a memory storing program instructions executable by the processor to actuate the extendible member to move to the extended position upon detecting a vehicle impact and before actuating an airbag.

13. The vehicle of claim 1, wherein the extendible member in the extended position is elongated along a vehicle-longitudinal axis.

14. The vehicle of claim 1, further comprising a door removably supported at one of the first pillar or the second pillar.

15. The vehicle of claim 1, wherein the extendible member in the extended position defines a chamber tapering from a first end to a second end.

16. The vehicle of claim 1, further comprising a second extendible member supported by the first pillar and spaced from the extendible member along a vehicle-vertical axis.

17. The vehicle of claim 1, wherein the extendible member is positioned to restrain an occupant in a passenger cabin of the vehicle.

18. The vehicle of claim 1, wherein the extendible member is below a beltline.

19. The vehicle of claim 1, wherein the extendible member in the retracted position is spaced from the second pillar.

\* \* \* \* \*